(12) United States Patent
Cooper et al.

(10) Patent No.: US 8,463,977 B2
(45) Date of Patent: Jun. 11, 2013

(54) USE OF PCI EXPRESS FOR CPU-TO-CPU COMMUNICATION

(75) Inventors: Stephen Dale Cooper, Escondido, CA (US); Braden Michael Cooper, Escondido, CA (US)

(73) Assignees: Stephen Dale Cooper, Escondido, CA (US); Braden Michael Cooper, Escondido, CA (US)

( * ) Notice: Subject to any disclaimer, the term of this patent is extended or adjusted under 35 U.S.C. 154(b) by 222 days.

(21) Appl. No.: 12/878,372

(22) Filed: Sep. 9, 2010

(65) Prior Publication Data

US 2012/0066430 A1    Mar. 15, 2012

(51) Int. Cl.
*G06F 13/00*    (2006.01)

(52) U.S. Cl.
USPC ............ 710/316; 710/104; 710/311; 710/312

(58) Field of Classification Search
USPC .................. 710/104, 107, 306, 311, 312, 316
See application file for complete search history.

(56) References Cited

U.S. PATENT DOCUMENTS

| 7,464,174 | B1 * | 12/2008 | Ngai | 709/234 |
| 7,562,176 | B2 * | 7/2009 | Kloeppner et al. | 710/314 |
| 7,725,632 | B2 | 5/2010 | Baba et al. | |
| 7,979,621 | B2 * | 7/2011 | Gregg | 710/316 |
| 2010/0125653 | A1 * | 5/2010 | Cherian et al. | 709/223 |

OTHER PUBLICATIONS

Cooper, Steve; "Using PCIe over Cable for High Speed CPU-to-CPU Communications"; PCI-SIG Developers Conference 2008; PCI-SIG; Jun. 2008; accessed at <URL http://www.pcisig.com/developers/main/training_materials/#2008>.*

Regula, Jack; "Using Non-transparent Bridging in PCI Express Systems"; PLX Technology, Inc.; Jun. 1, 2004.*

* cited by examiner

*Primary Examiner* — Glenn A Auve
(74) *Attorney, Agent, or Firm* — John L. Rogitz (57) ABSTRACT

CPUs that generate PCIe auxiliary signals and changing clock signals nevertheless communicate with each other using PCIe owing to PCIe switch assemblies that are disposed in the communication paths to isolate and terminate the auxiliary signals from reaching other CPUs and to isolate changing clock signals, communicating with each other using a fixed clock derived from one of the changing clock signals. Also, the CPUs directly access the memories of CPUs to which they wish to write data so that data is directly written from one CPU memory to another without store-and-forward operations being needed in the network.

5 Claims, 8 Drawing Sheets

FIG. 14
DMA and Write-Combining

FIG. 13
Hot Swap Logic

FIG. 12
Initialization Logic for DMA

USE OF PCI EXPRESS FOR CPU-TO-CPU COMMUNICATION

I. FIELD OF THE INVENTION

The present application relates generally to using peripheral component interface express (PCIe) for communication between plural central processing units (CPU).

II. BACKGROUND OF THE INVENTION

Peripheral component interface express (PCIe) is a point-to-point electrical interface designed for CPU communication with peripheral components. As such, it is optimized for a type of communication in which one node (the CPU) is a control element and the other node is a controlled element. Because of this, PCIe conceptualizes "upstream" and "downstream" nodes, the CPU typically occupies the upstream function. PCIe communication paths are typically manifested by multiple transmit and receive signals as well as a number of auxiliary signals. These signals are physically sent over wire or fiber optic media. PCIe switch devices are used to provide interface fan-out such that one CPU can control multiple peripheral components.

As understood herein, PCIe might advantageously be used for very fast CPU-to-CPU communication but owing to inherent impediments arising from the upstream/downstream concept originally intended for a controlled node-controlling node environment, implementing PCIe in a CPU-to-CPU communication context poses non-trivial challenges. This is because each CPU in effect would be an "upstream" node and would attempt to send signals that would interfere with those of the other CPU.

SUMMARY OF THE INVENTION

Accordingly, a method includes using a host peripheral component interface express (PCIe) switch assembly operating in a transparent mode to receive a changing clock signal and PCIe auxiliary signals from a host CPU. The host PCIe switch assembly isolates and terminates the auxiliary signals and outputs a fixed clock signal derived from the changing clock signal. The method further includes communicating the fixed clock signal to a first target PCIe switch assembly operating in a non-transparent (NT) mode and using the first target PCIe switch assembly to isolate and terminate PCIe auxiliary signals from a first target CPU in a network of target. CPUs and to isolate a changing clock signal from the first target CPU. Data between the host CPU and first target CPU is communicated through the PCIe switch assemblies. Also, a respective memory region of the first target CPU is allocated for each other target CPU in the network. This allows any CPU in the network to directly communicate with any other CPU in the network. This feature makes the network appear as a "virtual mesh architecture" regardless of the actual physical architecture. A controller in the first target PCIe switch assembly combines data packets received from the first target CPU into bursts and the bursts are transmitted to an intended recipient CPU designating register addresses associated with memory of the intended recipient CPU.

In example implementations the host CPU is associated with a top tier in a network of CPUs. The host CPU keeps track of all active target CPUs that are directly connected to the host PCIe switch assembly such that when a target CPU is added or removed from the top tier, the host CPU updates its network topology map and notifies the other directly connected target CPUs. The target CPUs then allocate or deallocate respective appropriate memory regions. The host CPU also notifies a second tier host CPU in the network of a new network topology map. The second tier host CPU updates its topology map and communicates the map downward in the network. The CPUs may be embodied in standalone computers or on blade server boards.

In another aspect, an assembly has a host CPU, at least a first target CPU communicating with the host CPU using a peripheral component interface express (PCIe) communication path, and a first PCIe bridge in the path between the CPUs which operates in a transparent mode. A second PCIe bridge is in the path between the first PCIe bridge and the target CPU. The bridges isolate and terminate PCIe auxiliary signals.

If desired plural target CPUs in addition to the host CPU and first target CPU may be provided. The target CPUs can be arranged in a communication network, wherein each target CPU is associated with a respective memory, and each target CPU dedicates a respective region of its memory to a respective one of every other target CPU in the network. The first target CPU writes data directly into the memory of a second target CPU with the data not being stored and forwarded between the first and second target CPUs.

In non-limiting embodiments, data to be transferred resides in a memory area associated with the first target CPU and the memory area is designated as write-combinable by setting appropriate CPU registers. The first target CPU creates 32-byte packets from the data to be transferred and sends the packets to its associated PCIe bridge. A controller in the associated PCIe bridge combines the packets in longer bursts and transfers the bursts, further increasing performance. Alternatively, special switch devices with built-in direct memory access (DMA) controllers and the ability to create PCIe burst transfers may be used.

In another aspect, a system includes plural central processing units (CPUs) that generate peripheral component interface express (PCIe) auxiliary signals and changing clock signals communicating with each other using PCIe. PCIe switch assemblies are disposed in communication paths between CPUs to isolate and terminate the auxiliary signals from reaching other CPUs and to isolate changing clock signals. The PCIe switch assemblies communicate with each other using a fixed clock derived from one of the changing clock signals.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Overview

Present principles understand that PCIe may advantageously be used for high performance CPU to CPU communication, but that technical hurdles to do so must be overcome. For example, the PCIe specification defines host and target roles in a way that does not allow CPU to CPU direct interconnections because the CPU drives certain clocking and auxiliary signals while targets receive these signals, and multiple CPUs cannot be directly connected or both would be driving the same signals simultaneously. Accordingly, using present principles the auxiliary signals following the reference clock entry in the table below are isolated by routing these signals to an isolation circuit, which terminates the signals:

| List: | Driven By: | Received By: |
|---|---|---|
| 100 MHz Reference Clock (CREFCLKp, CREFCLKn) | Upstream | Downstream |
| Cable Present (CPRSNT#) | Downstream | Upstream |
| Platform Reset (CPERST#) | Upstream | Downstream |
| Cable Power On (CPWRON#) | Upstream | Downstream |
| Auxiliary Return (SB_RTN) | Both | Both |
| Cable Wake (CWAKE#) | Upstream | Downstream |
| 3.3 V Power (+3.3 V POWER, PWR_RTN) to connector only | Both | Both |

In contrast, clocking signals must be used and not merely discarded but as understood herein, each CPU has a clock with its own continuously changing spread spectrum clock (SSC) frequencies, and since PCIe switch components don't allow multiple PCIe ports to have multiple different SSCs, present principles recognize a need to address this. As also understood herein, some PCIe switch components allow one SSC signal on one port with the other ports working with a fixed frequency clock, as long as the fixed frequency clock rate is higher than the maximum SSC clock frequency. Another requirement is for each CPU to be able to map certain memory addresses, such that reads or writes to those addresses will go directly to the memory of another CPU.

In addition to the above recognitions, present principles further understand that to achieve high performance across PCIe links in the networking architecture, the data to be transferred must be sent via PCIe burst transfers (address, length, data, data . . . data), but typical CPU chips normally read and write memory using a much slower single-transaction (address, data . . . address, data) technique.

With the above considerations in mind, according to present principles non-transparent (NT) PCIe bridges are used to isolate and reconfigure the clock signal and provide memory mapping aliasing. The NT bridges allow cross-mapping of memory address segments through the bridge so that either CPU can read and write to/from certain segments of other CPU's memory. In effect, a "virtual target" device is created by isolating a CPU behind a non-transparent bridge such that it looks like an I/O endpoint to another host CPU. As explained further below this concept can be extended to multiple elements by incorporating PCIe switches which allow one host CPU to connect to multiple PCIe endpoints. To implement a full network, the architecture is further extended in a multi-tiered fashion.

The problem of establishing functional clocking in the presence of respective unique SSCs from each CPU is addressed by using two back-to-back switch components between CPUs. Each PCIe switch component isolates one SSC to a common fixed clock rate, allowing multiple CPU elements to be interconnected. The switch electronics can be contained on one or multiple boards.

As also discussed further below, a "host" CPU's basic input-output system (BIOS) code searches each PCIe bus and identifies each I/O endpoint. It then configures the endpoint device and allocates memory and interrupt resources. This cannot be done properly if multiple hosts are directly interconnected to each other, so non-transparent bridges are used to isolate PCIe bus segments. This stops normal CPU initialization programs (such as the BIOS) from seeing any devices on the far side of the NT bridge. Software running on each CPU initializes memory windows into each other CPU's memory. This creates a virtual mesh structure where any CPU can directly communicate with any other CPU. Combining a host CPU with a switch element "hides" the host CPU's uniqueness allowing all other node CPUs to be homogeneous. All of the usable CPUs are virtual targets, thus they can all be identical.

Other technical problems recognized by present principles that must be addressed to use PCIe for CPU to CPU communication include the fact that PCIe data must be sent via PCIe burst transfers (address, length, data, data . . . data), whereas typical CPU chips normally read and write memory using a much slower single-transaction (address, data . . . address, data) technique. Write-combining and PCIe-aware direct memory access (DMA), discussed further below, are used to overcome this. Specifically, in write-combining, the memory area to be transferred is designated as write-combinable by setting the appropriate CPU registers. Then, when data from this memory area is transferred to the PCIe interface, the CPU does so by creating 32-byte packets. This technique increases performance significantly.

PCIe-aware DMA, on the other hand, uses multiple DMA controllers within the isolating PCIe switch to move the data. These DMA controllers create long PCIe burst transfers, further increasing performance.

Also, in a network in which CPUs are added and removed each CPU must stay cognizant of the dynamically changing topology of the network. To achieve this, the host CPU that is associated with each top tier switch or switch blade keeps track of all active CPU elements that are directly connected to the switch. When an element is added or removed, the host CPU updates its network topology map and notifies the other directly connected CPU elements. These elements then allocate or de-allocate the appropriate memory region that is needed for interconnection. In a full network architecture, the tier 1 host also notifies the tier 2 host that the network topology map has changed. The tier 2 host then updates its topology map and communicates the new info downward to all the other tier 1 switches. These tier 1 switches then update their topology maps and communicate the data downward to their directly connected CPU elements.

Figure 1:
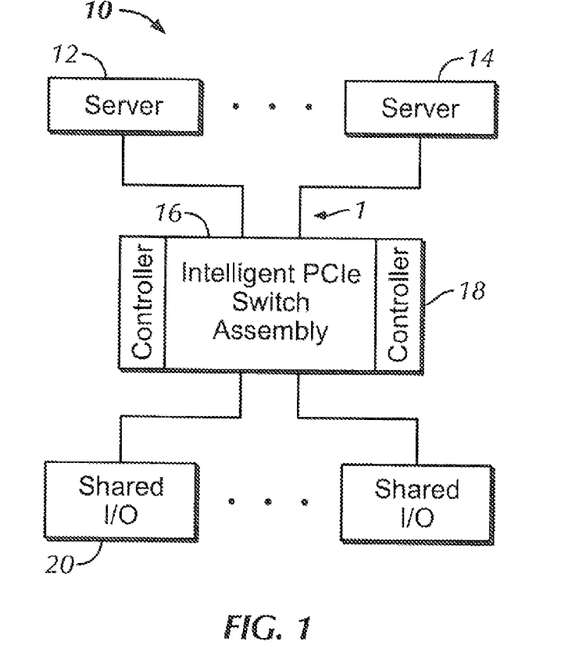
FIG. 1 is a simplified block diagram showing an example architecture for using PCIe for CPU to CPU communication using standalone CPU servers, switches, and input/output (I/O) devices, showing in an example embodiment various elements interconnected using PCIe over cable.

With the above overview in mind and referring initially to FIG. 1, a system 10 includes plural standalone servers 12, 14, each with its own respective central processing unit (CPU), communicating with each other through a PCIe switch assembly 16 using PCIe communication protocols. The switch assembly 16, also referred to herein as a "bridge" and a "non-transparent (NT)" bridge because it has at least one NT communication port, includes one or more switch controllers 18, also referred to herein as direct memory access (DMA) controllers for purposes of managing certain features described further below. Shared input/output (I/O) interfaces 20 may also communicate with the switch 16 as shown.

Figure 2:
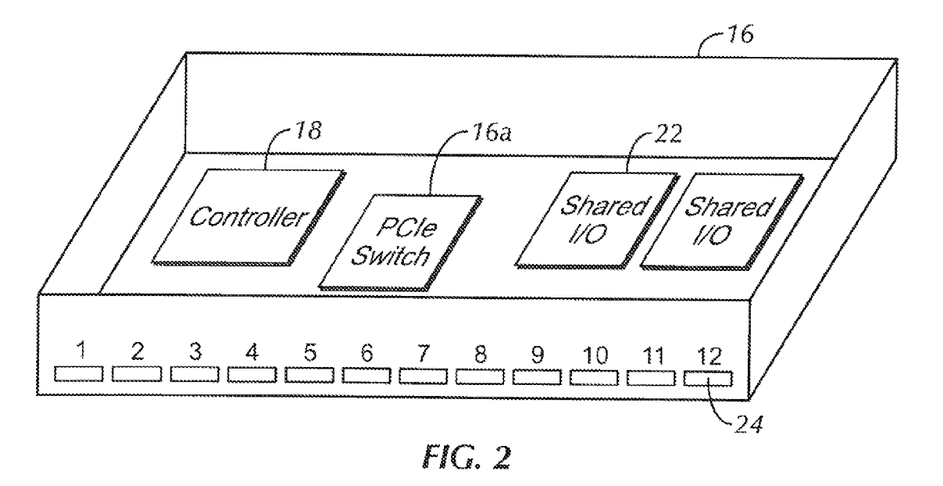
FIG. 2 is a perspective view of a standalone PCIe switch.

FIG. 2 shows an example switch assembly 16, in which a single controller 18 is shown communicating with a PCIe switch element 16a and shared I/O modules 22. The switch assembly 16 includes multiple communication ports 24. In the embodiment shown, twelve ports are arranged in a line as shown along one wall of the switch assembly and in some implementations twelve additional ports may be arranged in a line along the opposite wall. At least one of the ports 24 is an NT port. An example non-transparent (NT) bridge (switch assembly 16) is a switch chip with a non-transparent port.

Figure 3:
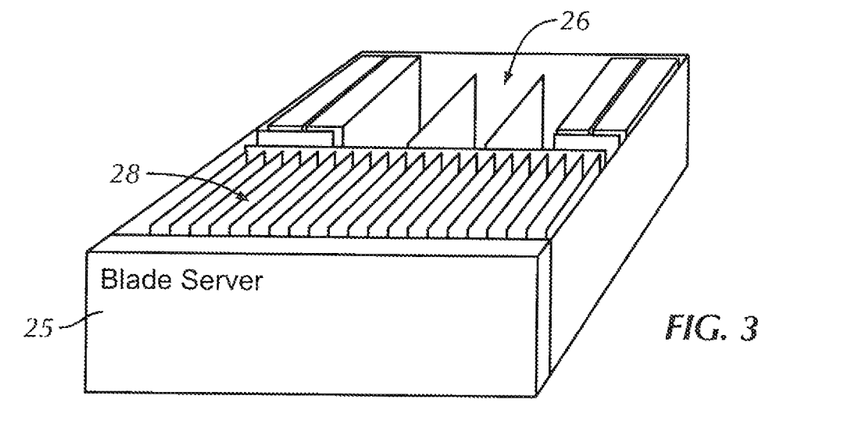
FIG. 3 is a perspective view of a blade server in which present principles may be embodied.
Figure 4:
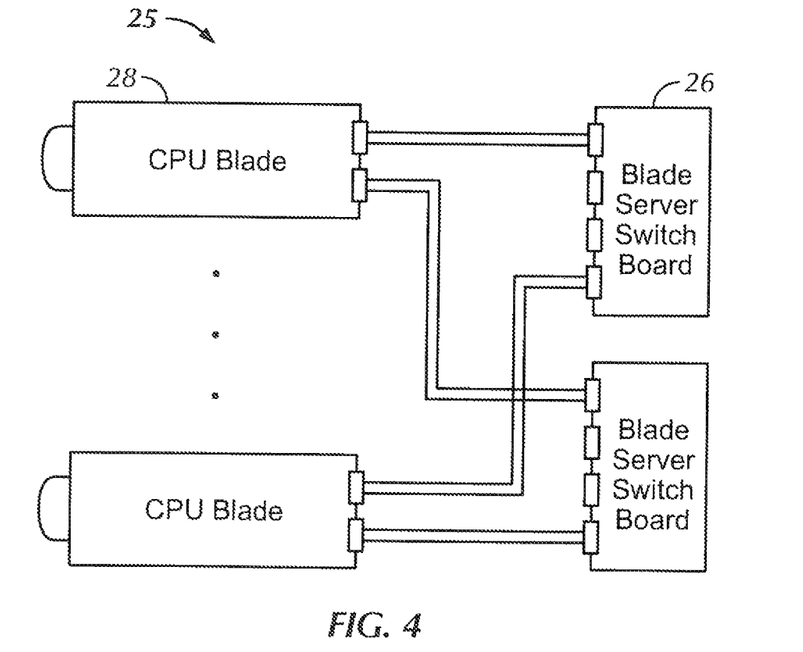
FIG. 4 is a block diagram illustrating that present principles may be used in a blade server environment, showing an example embodiment in which various blades are interconnected using PCIe over an internal backplane.

FIGS. 3 and 4 show a blade server assembly 25 which includes plural intelligent PCIe switch boards 26 through which plural CPU blades 28 communicate, to illustrate that present principles apply to blade server systems. As shown best in FIG. 4, each CPU board 28 may communicate with each of the switch boards 26. More broadly, present principles may be used over internal backplanes and cables, with blade server communication and for standalone CPU communications.

Figure 5:
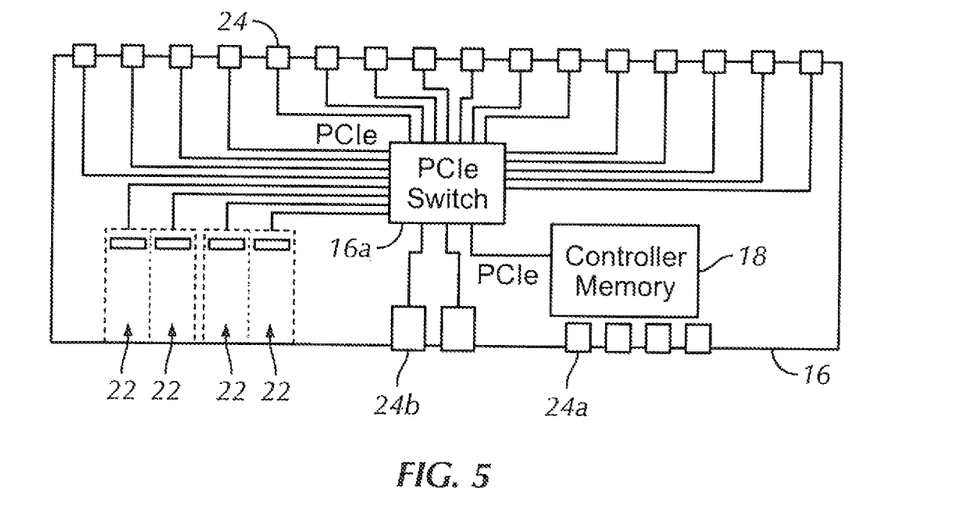
FIG. 5 is a schematic diagram of an example blade server switchblade in accordance with present principles.

FIG. 5 illustrates electronic details of the PCIe switch assembly 16 as might be implemented in a blade server environment. As shown, the switch element 16 communicates using PCIe protocol with the switch controller 18 and with each of the communication ports 24, also using PCIe protocol. In the blade server embodiment the ports 24 are connected to respective server blade boards and a host CPU, discussed further below, is connected to the switch controller 18 through host connection ports 24a. Ports 24b may be used to connect the switch element 16a with external connectors. The controller 18 provides PCIe initialization, PCIe host functions discussed below, redundancy of host functionality, additional computing power, and shared I/O capability and shareable I/O functions.

Figure 6:
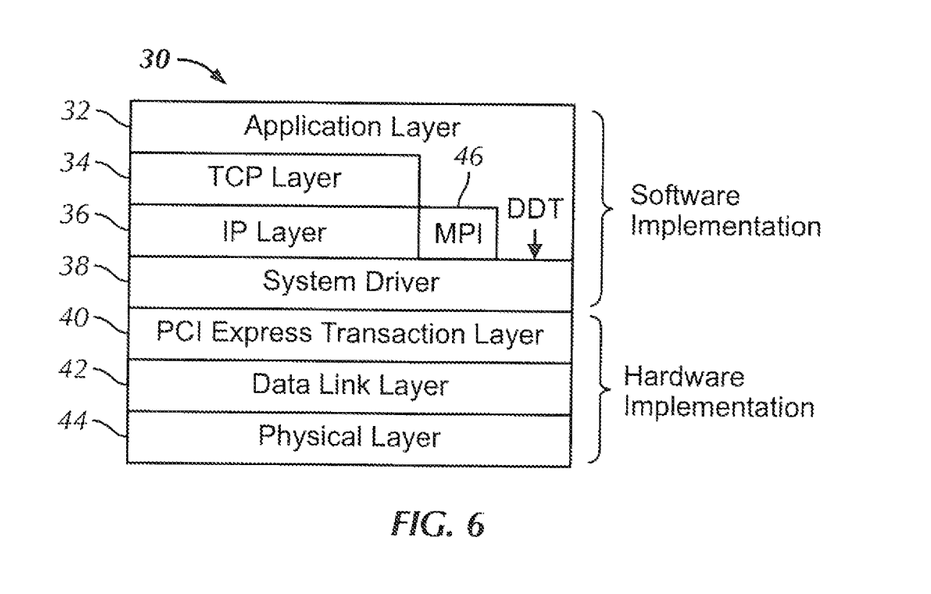
FIG. 6 is a diagram of a communication protocol stack in accordance with present principles.

Referencing the protocol stack 30 of FIG. 6, from top to bottom the stack includes an application layer 32, a transmission control protocol (TCP) layer 34, an Internet protocol layer 36, and a system driver 38 which interfaces with the three lower layers as shown, namely, a PCIe transaction layer 40, a data layer 42, and a physical layer 44. That is, the system driver 38 executes necessary translation between the TCP/IP layers 34, 36 and the PCIe transaction layer 40. Likewise, the system driver 38 executes necessary translation between the application layer 32 and the PCIe transaction layer 40 for purposes of DDT, and also executes necessary translation between the MPI layer 46 and the PCIe transaction layer 40. The bottom three layers 40-44 may be implemented in hardware while the top four layers 32-38 may be implemented in software, in example embodiments.

The transmission control protocol/Internet protocol (TCP/IP) layers 34, 36 provide standard networking protocol support such as file transfer protocol (FTP), file copy, web access, etc. that function as they do in Ethernet-based networks. Thus, software can communicate in the present system using standard TCP/IP protocols, so that off-the-shelf software can use the present system as if it were a conventional network interface controller (NIC). Further, a message passing interface (MPI) 46 provides standard function calls used in high-performance computing (HPC).

For direct data transfer (DDT) between CPUs as contemplated herein, however, the TCP/IP layers 34, 36 are not used. In DDT, respective memory regions in each CPU are mapped to all other CPUs, and direct writes into the other computer's memory are executed. That is, no data is stored and forwarded in DDT. Thus, each CPU element writes directly to memory of a target CPU without store and forward such that data transfers are to and from each machine's memory. Separate allocated memory is established for each possible pair of intercommunication nodes. Typically, one megabyte per pair can be allocated. DDT is represented in FIG. 6 as the application later 32 communicating directly with the system driver 38, bypassing the TCP/IP layers 34, 36. Example DDT protocol commands are provided below by way of non-limiting illustration:

```
DDT protocol commands:
    #include "libexpressnet.h"
    EN_FILE *ExpressNet_fopen(char *hostname, int stream, int timeout,
    int signo, int readmem, int writemem, HANDLE event, HANDLE
    detevt);
    int ExpressNet_fclose(EN_FILE *ef);
    size_t ExpressNet_fread(void *data, size_t size, size_t numb,
    EN_FILE *ef);
    size_t ExpressNet_fwrite(void *data, size_t size, size_t numb,
    EN_FILE *ef);
    int ExpressNet_fwait_for_data(size_t size, int timeout, EN_FILE *ef);
    int ExpressNet_fwait_for_space(size_t size, int timeout, EN_FILE *ef);
    int ExpressNet_fwait_on_write(int timeout, EN_FILE *ef);
    int ExpressNet_fwake_on_data(int amount, EN_FILE *ef);
    int ExpressNet_fwake_on_space(int space, EN_FILE *ef);
    EN_FILE *ExpressNet_open(char *hostname, int stream, int timeout,
    int signo, int readmem, int writemem, HANDLE event, HANDLE
    detevt);
    DWORD ExpressNet_attach(EN_FILE *ef);
    DWORD ExpressNet_init(EN_FILE *ef);
    int ExpressNet_status(EN_FILE *ef);
    char *ExpressNet_strerror(int errno);
```

Figure 7:
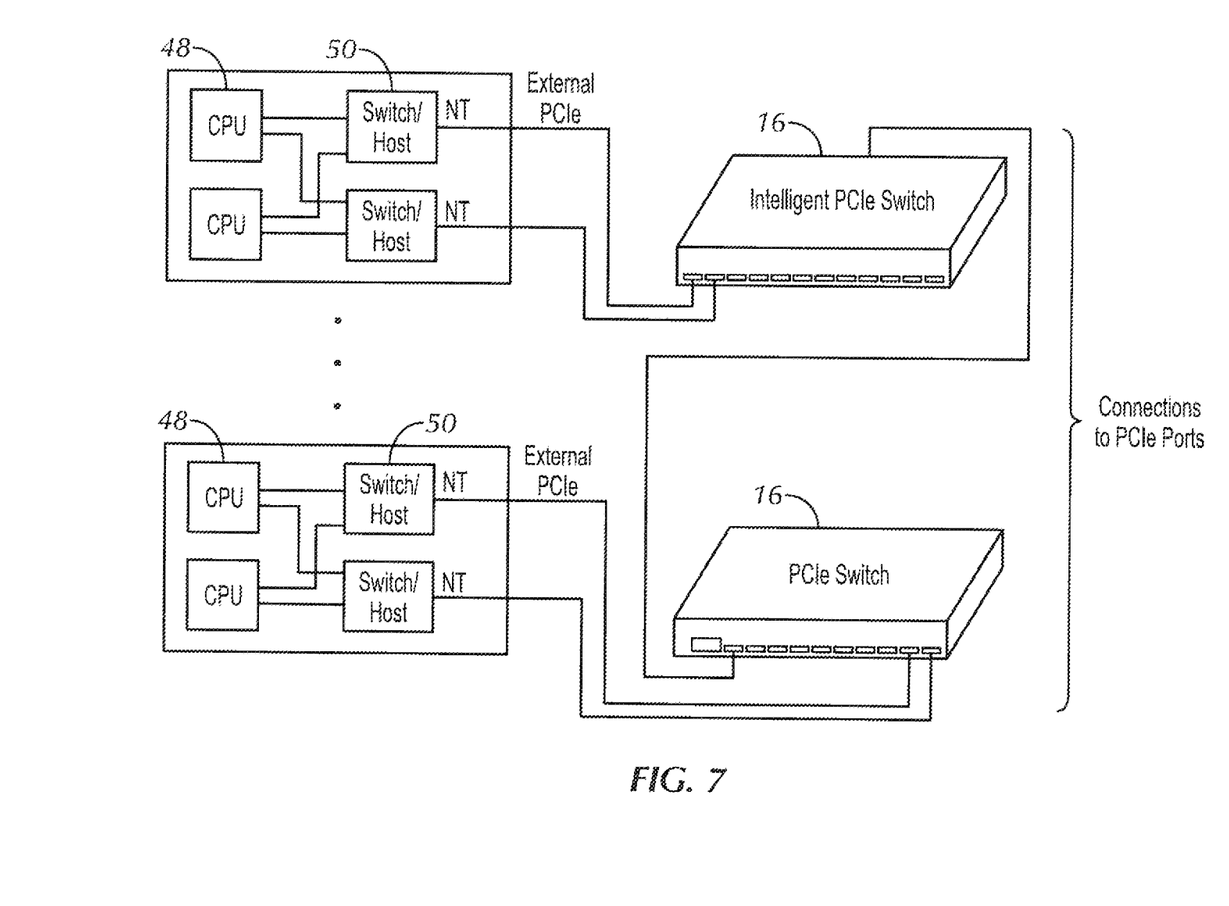
FIG. 7 is a block diagram illustrating that present principles may be used in a multi-chassis blade server network.

FIG. 7 is to illustrate a multi-chassis architecture illustrating PCIe networking across many CPU elements 48, each isolated from all other CPUs 48 in the system by its own respective NT PCIe bridge 50 that in all substantial respects can be identical in configuration to the intelligent PCIe switch assembly 16 discussed above. Note that the NT port of each bridge 50 is connected to another PCIe switch assembly 16, with the PCIe switch assemblies 16 connected to each other as shown. By "isolated" is meant that while CPU to CPU communication occurs in the network shown, the PCIe auxiliary signals discussed above from one CPU are isolated from other CPUs in the system, and no CPU must contend with continuously changing spread spectrum clock (SSC) frequencies of other CPUs. In effect, one CPU appears as an I/O endpoint to another CPU.

Figure 8:
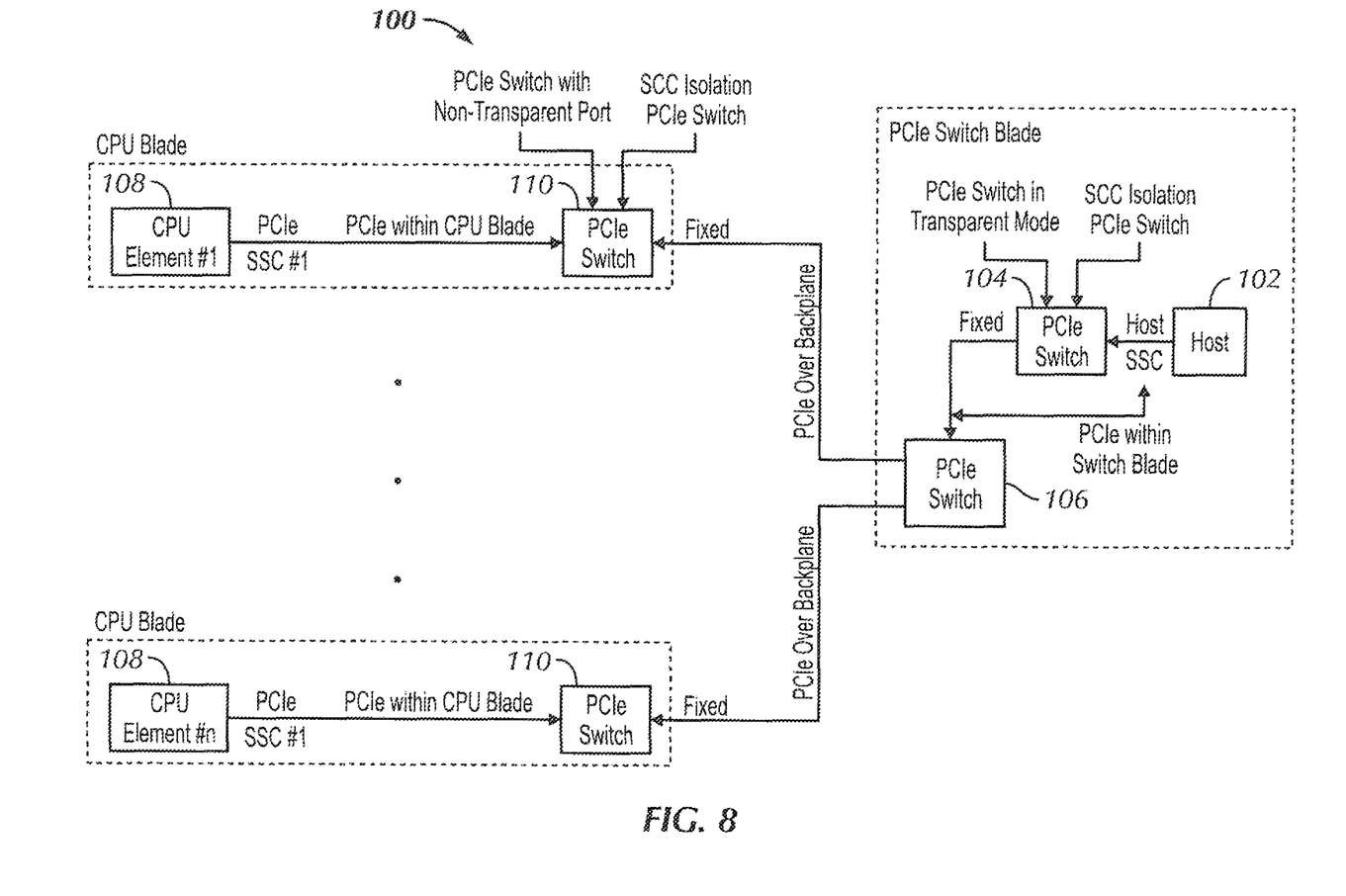
FIG. 8 is a block diagram showing components of a PCIe architecture that facilitates CPU to CPU communication.

FIG. 8 shows a system 100 embodied in a blade server configuration in which a host CPU 102 communicates with a host PCIe switch assembly 104 that is in all substantial respects identical in configuration and operation to the switch assembly 16 discussed above except that the host PCIe switch assembly 104 operates in the transparent mode by virtue of having its NT port disabled. The host PCIe switch assembly 104 isolates and terminates the auxiliary signals from the host CPU 102 and also isolates the changing SSC clock from the host CPU 102.

The host PCIe switch assembly 104 outputs a fixed clock signal to an auxiliary host PCIe switch assembly 106 operating in the NT mode as do all the target PCIe switch assemblies shown in FIG. 8. In the non-limiting example shown, the host CPU 102, host PCIe switch assembly 104, and auxiliary host PCIe switch assembly 106 are embodied in a server blade board, and each target CPU 108 with associated target PCIe switch assembly 110 likewise is embodied in a respective server blade board, with the server blade boards being electrically connected by a server blade backplane. The target PCIe switch assemblies 110 isolate the auxiliary and clocking signals from their respective target CPU 108 so that only a fixed clock signal is used between the PCIe switch assemblies 106, 110 in the system 100 as shown.

Figure 9:
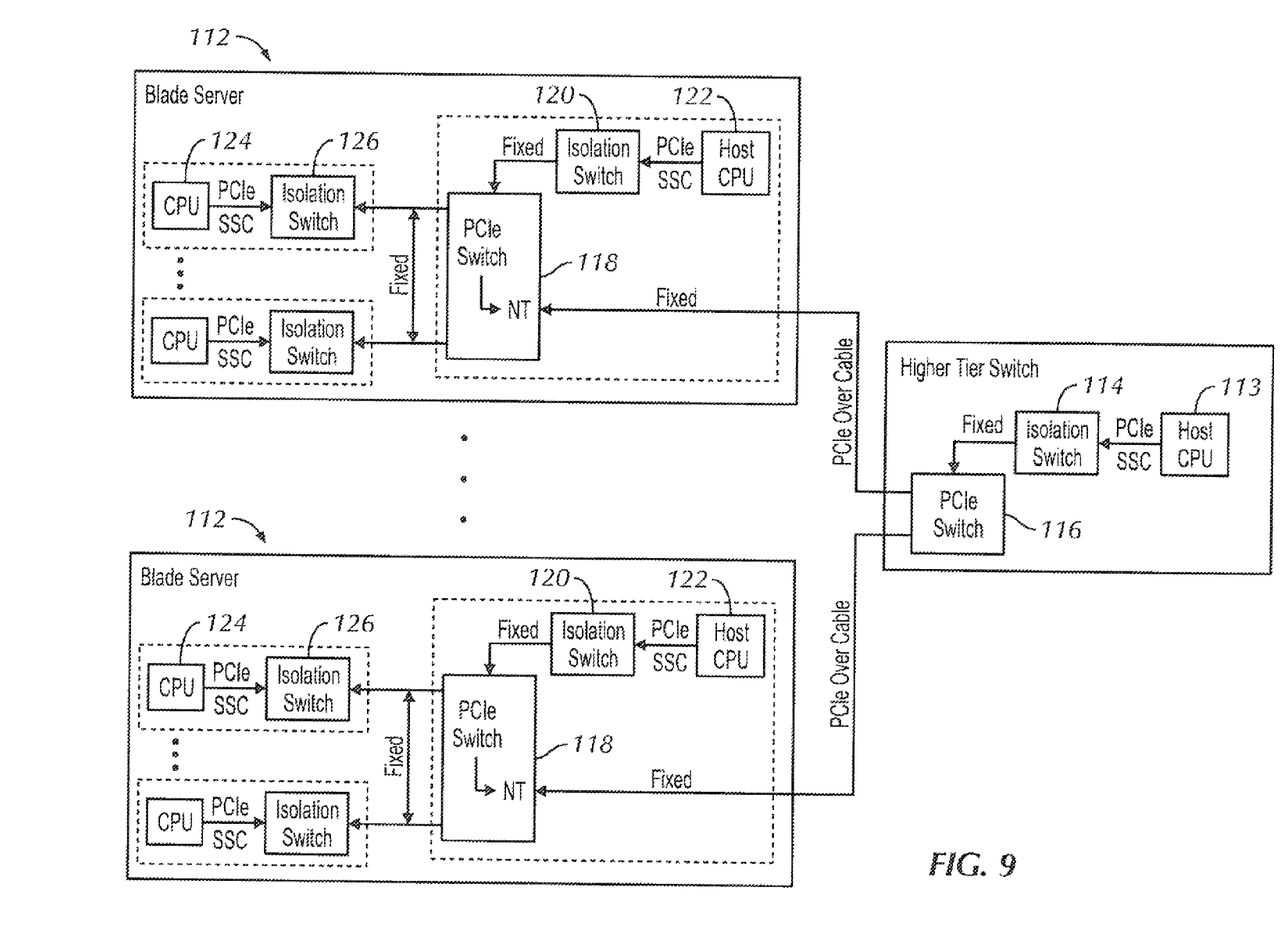
FIG. 9 is a block diagram showing components of a larger PCIe architecture that facilitates CPU to CPU communication.

FIG. 9 shows a full multi-tiered network 112 of CPUs communicating with each other using PCIe, although for simplicity only two tiers are shown. The reason for multiple tiers of CPUs is that PCIe switch assemblies may have a limited number of ports, e.g., twenty four, while it may be desired to establish a network of hundreds or thousands of CPUs communicating using PCIe.

In FIG. 9, a higher tier host CPU 113 communicates through a transparent higher tier host PCIe switch assembly 114 which in turn communicates with a higher tier auxiliary host PCIe switch assembly 116. A fixed clock derived from the changing SSC clock of the higher tier host CPU 113 is sent through cables to auxiliary lower tier host PCIe switch assembles 118 operating in the NT mode. Each auxiliary lower tier host PCIe switch assembly 118 receives signals from a respective lower tier host PCIe switch assembly 120 operating in the transparent mode and receiving signals including auxiliary signals and a changing SSC clock signal from a respective lower tier host CPU 122. The higher tier host CPU 113 thus communicates with the lower tier host CPUs 122, each of which communicates with respective target CPUs 124 in the lower tier which are behind respective isolation target PCIe switch assemblies 126. The PCIe switch assemblies shown in FIG. 9 operate substantially identically to their counterpart assemblies described above. One of the lower tier host CPUs 122 may in turn communicate with host CPUs of an even lower tier.

Figure 10:
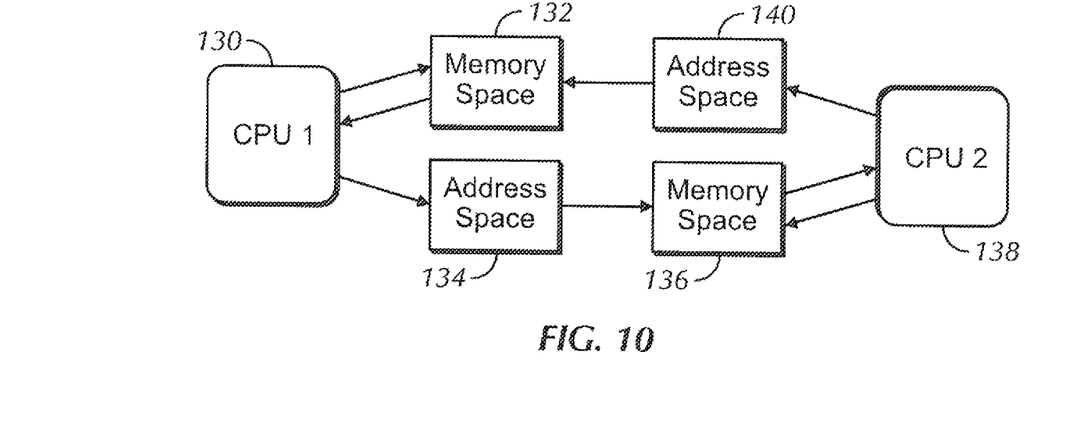
FIG. 10 is a schematic diagram illustrating direct data transfer (DDT) between two CPUs in accordance with principles.
Figure 11:
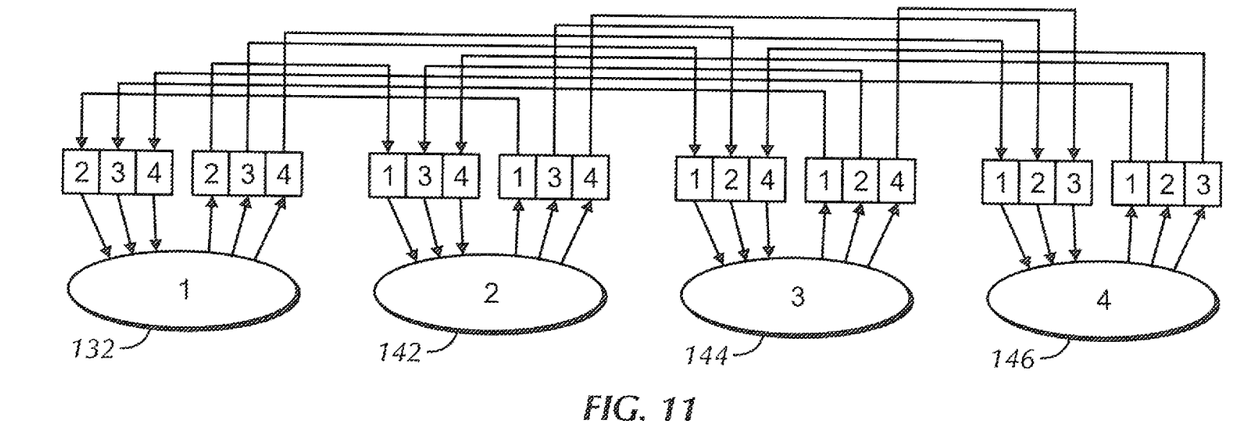
FIG. 11 is a schematic diagram illustrating that each CPU maintains a separate allocated memory portion for every other CPU thus creating a virtual mesh network.

Whether in a large tiered network such as that shown in FIG. 9 or a simpler single tier system such as that shown in FIG. 8, as mentioned previously each target CPU maintains a respective dedicated region in its memory for communication with every other target CPU in the system for supporting direct memory access (DMA) and direct data transfer (DDT), and FIGS. 10 and 11 illustrate this. As shown in FIG. 10, a first CPU 130 has a memory 132 and an address region 134. When the first CPU 130 desires to write data to the memory 136 of a second CPU 138, it does so by outputting the data from its address space 134 to the memory space 136 of the second CPU 138, a portion of which is allocated to the first CPU. Likewise, when the second CPU 138 desires to write data to the memory 132 of the first CPU 130, it does so by outputting the data from its address space 140 to the memory space 132 of the first CPU 130, a portion of which is allocated to the second CPU 138.

Assuming four CPUs for simplicity, FIG. 11 illustrates that portions 2, 3, and 4 of the first memory 132 are respectively dedicated to memories 142, 144, 146 associated with second, third, and fourth CPUs. Likewise, each of the memories 142, 144, 146 associated with second, third, and fourth CPUs maintains dedicated regions for the other CPUs in the system.

Figure 12:
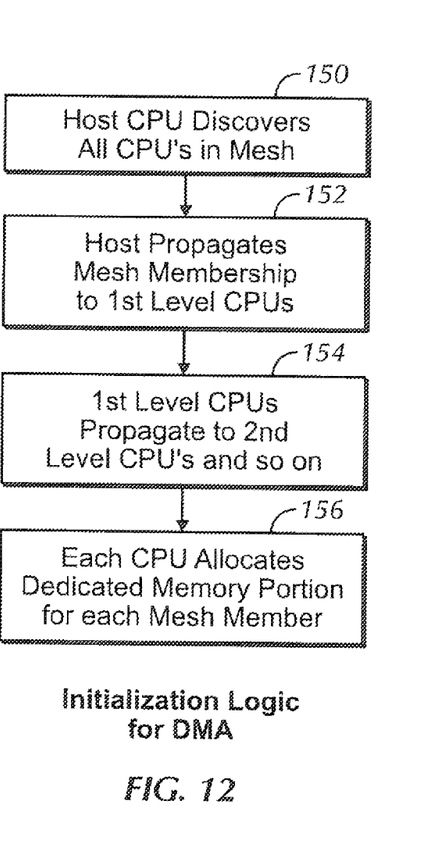
FIG. 12 is a flow chart showing example network initialization logic.
Figure 13:
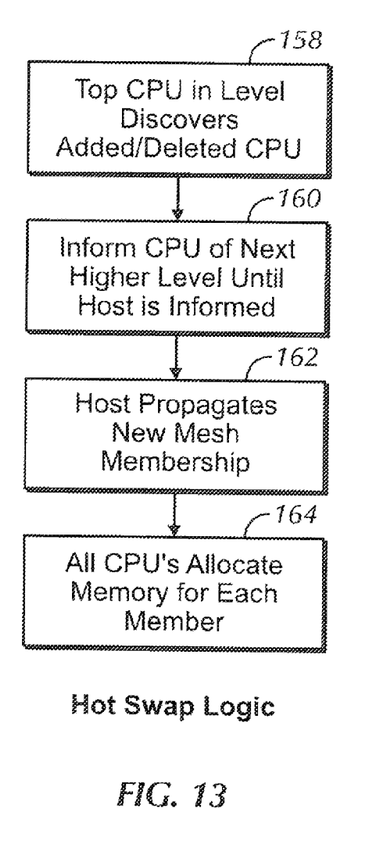
FIG. 13 is a flow chart showing example hot swap logic.
Figure 14:
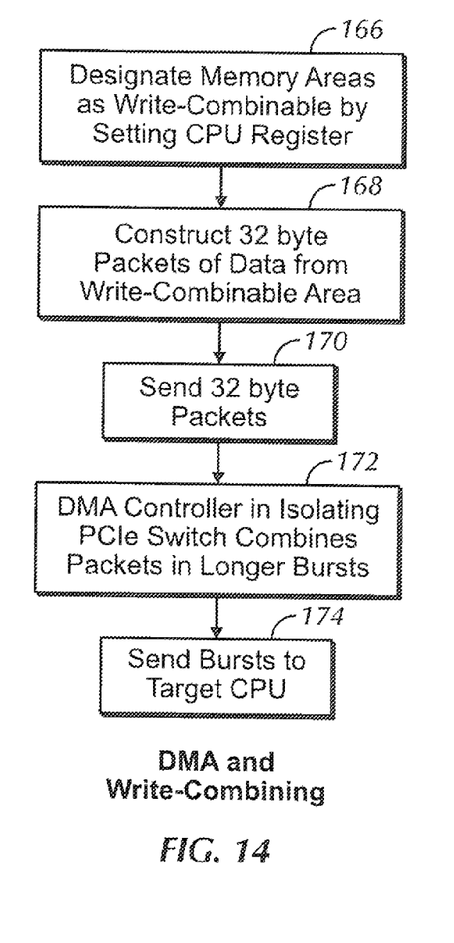
FIG. 14 is a flow chart showing example direct memory access (DMA) and write combining logic.

The flow charts of FIGS. 12-14 illustrate example logic in conformance with principles set forth above. At block 150 of FIG. 12, for DMA initialization purposes the host CPU discovers all other CPUs in the network, albeit seen by the host CPU as I/O endpoints. The discovered network membership is propagated at block 152 to all CPUs in the tier of the host and at block 154 to all host CPUs of lower tiers, which inform their respective target CPUs of network membership until all CPUs in the system are informed of the CPU network membership. Then, at block 156 each CPU in the network allocates a respective dedicated portion of its memory to every other CPU in the network. Also, if desired each CPU informs all other CPUs of their respective register addresses in the informing CPU's memory. Subsequent CPU to CPU communications are executed using DMA as described above because each sending CPU knows, for the intended recipient CPU, the register addresses dedicated to it in the recipient's memory and so writes data directly to that address.

FIG. 13 shows logic that can be executed to support continued DMA during system operation when a CPU is added to or removed from the network. Commencing at block 158 the host CPU in the tier of the added or removed CPU discovers an added or removed CPU and at block 160 informs the host CPU of the next highest tier of the change, which in turn informs the next highest host until the top tier host is informed of the change. The top tier host then propagates a new network membership to all CPUs in the system in accordance with above principles at block 162, i.e., the top tier host informs its target CPUs and all host CPUs in the next lower tier, which inform the host CPUs in their next lowest tier, and so on until new network membership is propagated throughout the system. Then, at block 164 all CPUs allocate respective memory regions to all other CPUs and inform other CPUs of their respective register addresses in the informing CPU's memory.

FIG. 14 shows additional logic that may be executed to enhance DMA. Commencing at block 166, a CPU designates a particular memory area holding data desired to be written to another CPU as "write combinable" by setting corresponding registers in the CPU. At block 168, the CPU establishes 32 byte packets of data from the write-combinable area and sends those packets to its PCIe switch assembly at block 170. At block 172, the switch controller of the switch assembly combines plural 32 byte packets into longer burst segments and sends the bursts to the target CPU at block 174.

While the particular USE OF PCI EXPRESS FOR CPU-TO-CPU COMMUNICATION is herein shown and described in detail, it is to be understood that the subject matter which is encompassed by the present invention is limited only by the claims.

What is claimed is:
1. Method comprising:
using a host peripheral component interface express (PCIe) switch assembly operating in a transparent mode to receive a changing clock signal and PCIe auxiliary signals from a host CPU;

using the host PCIe switch assembly to isolate and terminate the auxiliary signals and output a fixed clock signal derived from the changing clock signal;

communicating the fixed clock signal to a first target PCIe switch assembly operating in a non-transparent (NT) mode;

using the first target PCIe switch assembly to isolate and terminate PCIe auxiliary signals from a first target CPU in a network of target CPUs and to isolate a changing clock signal from the first target CPU;

communicating data between the host CPU and first target CPU through the PCIe switch assemblies;

allocating a respective memory region of the first target CPU for each other target CPU in the network;

using a controller in the first target PCIe switch assembly to combine data packets received from the first target CPU into bursts; and transmitting the bursts to an intended recipient CPU designating register addresses associated with memory of the intended recipient CPU, wherein the host CPU is associated with a top tier in a network of CPUs, the host CPU keeping track of all active target CPUs that are directly connected to the host PCIe switch assembly such that when a target CPU is added or removed from the top tier, the host CPU updates its network topology map and notifies the other directly connected target CPUs which then allocate or de-allocate respective appropriate memory regions, the host CPU also notifying a second tier host CPU in the network of a new network topology map.

2. The method of claim 1, wherein data to be transferred resides in a memory area associated with the first target CPU and the memory area is designated as write-combinable by setting appropriate CPU registers, the first target CPU creating 32-byte packets from the data to be transferred and sending the packets to the first target PCIe switch assembly.

3. The method of claim 1, wherein the second tier host CPU updates its topology map and communicates the map downward in the network.

4. The method of claim 1, wherein the CPUs are embodied in standalone computers.

5. The method of claim 1, wherein the CPUs are embodied on blade server boards.

* * * * *